United States Patent

Hirayanagi et al.

[11] Patent Number: 6,062,367
[45] Date of Patent: May 16, 2000

[54] FRICTION PLATE

[75] Inventors: Tsuyoshi Hirayanagi; Shigeki Umezawa, both of Shizuoka, Japan

[73] Assignee: NSK-Warner Kabushiki Kaisha, Tokyo, Japan

[21] Appl. No.: 09/189,934

[22] Filed: Nov. 12, 1998

[30] Foreign Application Priority Data

Nov. 11, 1997 [JP] Japan .................................. 9-308847

[51] Int. Cl.$^7$ ............................. F16D 13/74; F16D 13/64
[52] U.S. Cl. ................................. 192/107 R; 192/113.36; 188/264 E
[58] Field of Search .............................. 192/70.12, 70.14, 192/85 AA, 107 R, 113.3, 113.34, 113.36; 188/71.6, 264 D, 264 E

[56] References Cited

U.S. PATENT DOCUMENTS

| | | | |
|---|---|---|---|
| 4,396,100 | 8/1983 | Eltze | 192/70.12 |
| 4,674,616 | 6/1987 | Mannino, Jr. | 192/107 R |
| 5,094,331 | 3/1992 | Fujimoto et al. | 192/70.12 |

*Primary Examiner*—Richard M. Lorence
*Attorney, Agent, or Firm*—Sughrue, Mion, Zinn, Macpeak & Seas, PLLC

[57] ABSTRACT

A friction plate is constituted by a core plate, and friction members fixed respectively to opposite surfaces of the core plate. The friction member has oil passages, extending therethrough from its inner peripheral surface to its outer peripheral surface, and oil grooves which are open to the inner peripheral surface, but do not extend through the friction member. The area ratio of the oil grooves to the oil passages is 25% to 100%; and the width of the oil groove is not larger than the width of the oil passage. The length of the oil groove is not less than ¼ of the length of the oil passage. It is not necessary that all of the oil grooves have the same length. Preferably, the width of the oil passage, as well as the width of the oil groove, is not more than 3 mm. The oil passages and the oil grooves may be inclined relative to the radial direction.

8 Claims, 7 Drawing Sheets

FRICTION PLATE

BACKGROUND OF THE INVENTION

1. Field of the Invention

The present invention relates to a friction plate of a wet multi-disk clutch used in an automatic transmission, a friction engagement device or the like.

2. Description of the Related Art

FIG. 1 shows a basic structure of a wet multi-disk clutch. Reference numeral 1 denotes a snap ring; 2, a flange; 3, a separator plate; 4, a spline; 5, a drum connected to one rotation shaft; 6, an O-ring; 7, a core plate of a friction plate; 8, a hub connected to the other rotation shaft; 9, a piston for pressing the clutch; 10, a friction member fixed to each of opposite sides of the core plate; 11, an oil groove formed in the surface of the friction member; and 12, a lubricating oil supply port formed in the hub 8.

The friction plate 20 is constituted by the core plate 7 and the friction members 10.

When the piston 9 is pushed in a right direction (FIG. 1), the separator plates 3 and the friction plates 20 are pressed toward the flange 2, so that the rotation is transmitted between the drum 5 and the hub 8.

FIG. 2 shows a surface structure of a conventional friction plate 20, and a friction member 10 is fixed to each side or surface of a core plate 7. The friction member 10 has oil passages 21, extending therethrough from its inner peripheral surface 10a to its outer peripheral surface 10b, and oil grooves 11 which are open at their inner ends to the inner peripheral surface 10a, but does not extend to the outer peripheral surface 10b. The plates (disks) of the clutch are cooled by circulating oil. Simultaneously, when the clutch is to be disengaged, the plates are separated from one another by a pressure due to a centrifugal force of the oil in the oil grooves 11, thereby achieving a good clutch-disengaging effect.

In order to further enhance this clutch-disengaging effect, the width of the oil grooves 11 is larger than the width of the oil passages 21 so that the amount of the oil in each oil groove 11 can be increased.

FIG. 12 shows a graph in which the ordinate axis represents a torque (N m), and the abscissa axis represents a braking time (S (second)). A dot-and-dash line B indicates the conventional structure in which the oil grooves have a large width. Accordingly, the friction coefficient is low at the time of engagement of the clutch if the amount of the oil is too large. In contrast, if there is provided no oil groove, or if the oil grooves are too small, so that the amount of oil is small, an oil film runs short, so that the friction coefficient, obtained at the time of engagement of the clutch, becomes too high, as indicated by a broken line C in FIG. 12.

If the width of the oil grooves 11 is large, and the distal end of each oil groove 11 is disposed close to the outer peripheral surface 10b, then an outer peripheral portion 10c (see FIG. 2) has a narrow, elongate shape, and therefore there are encountered not only a problem that the strength is lowered but also a problem that heat is liable to be generated since these outer peripheral portions are narrow and less liable to dissipate heat.

SUMMARY OF THE INVENTION

It is an object of the present invention to provide a friction plate of a wet multi-disk clutch which achieves a good clutch-disengaging effect, and has a long lifetime.

In order to solve the above problems, the present invention provides a friction plate in which an area ratio of oil grooves, not extending through a friction member, to oil passages extending through the friction member from an inner peripheral surface thereof to an outer peripheral surface thereof, is 25% to 100%, and the width of the oil groove is not larger than the width of the oil passage.

Preferably, the length of the oil groove is not less than ¼ of the length of the oil passage.

DETAILED DESCRIPTION OF THE INVENTION

Detailed description of the present invention will be described as follows referring to the accompanying drawings.

Figure 10:
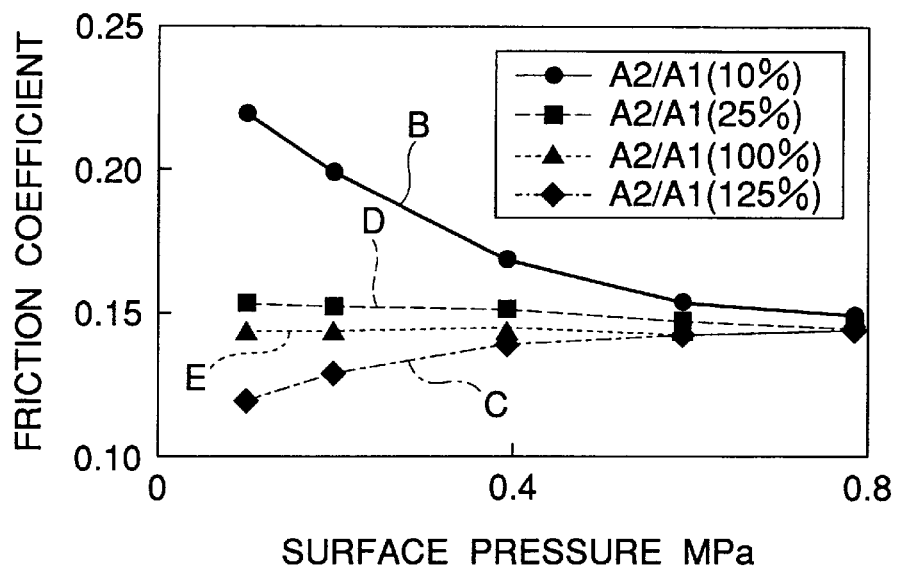
FIG. 10 is a graph showing the relation between the area ratio of oil passages to oil grooves and a friction coefficient.

FIG. 10 shows a change obtained when changing the ratio of an area $A_2$ of oil grooves to an area $A_1$ of oil passages. In this Figure, the ordinate axis represents a friction coefficient, and the abscissa axis represents a surface pressure (bearing pressure) (MPa). A curve B indicates the case where the ratio of $A_2$ to $A_1$ is 10% (that is, the amount of oil is too small), and an oil film runs short, so that the initial friction coefficient becomes too high. A curve C indicates the case where the ratio of $A_2$ to $A_1$ is 125% (that is, the amount of oil is too large), and the initial friction coefficient becomes too low. A curve D indicates the case where $A_2/A_1$ is 25%, and a curve D indicates the case where $A_2/A_1$ is 100%, and it will be appreciated that the friction coefficient is stable when $A_2/A_1$ is 25% to 100%. The tests, shown in FIG. 10, were conducted at a rotational speed of 3,600 rpm.

Figure 12:
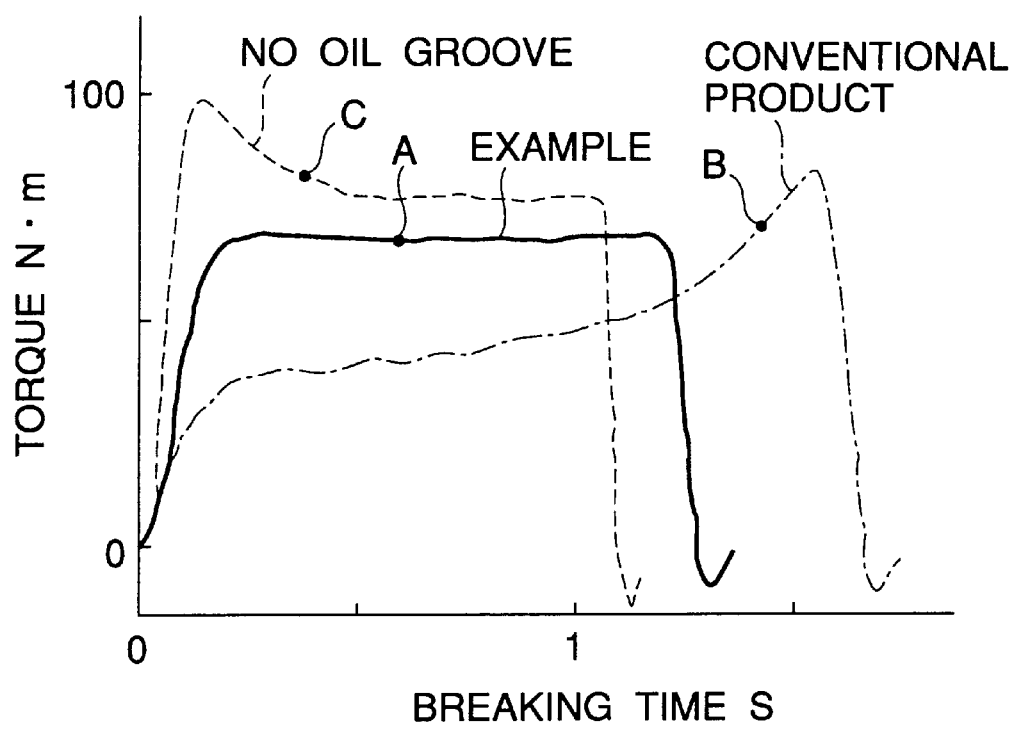
FIG. 12 is a view showing the comparison between torque waveforms.

In the graph shown in FIG. 12, a solid line A indicates the case of the present invention. It is understood that the torque is always extremely stable. The tests, shown in FIG. 12, were conducted at a rotational speed of 3,600 rpm at a bearing pressure of 0.7 MPa.

Figure 1:
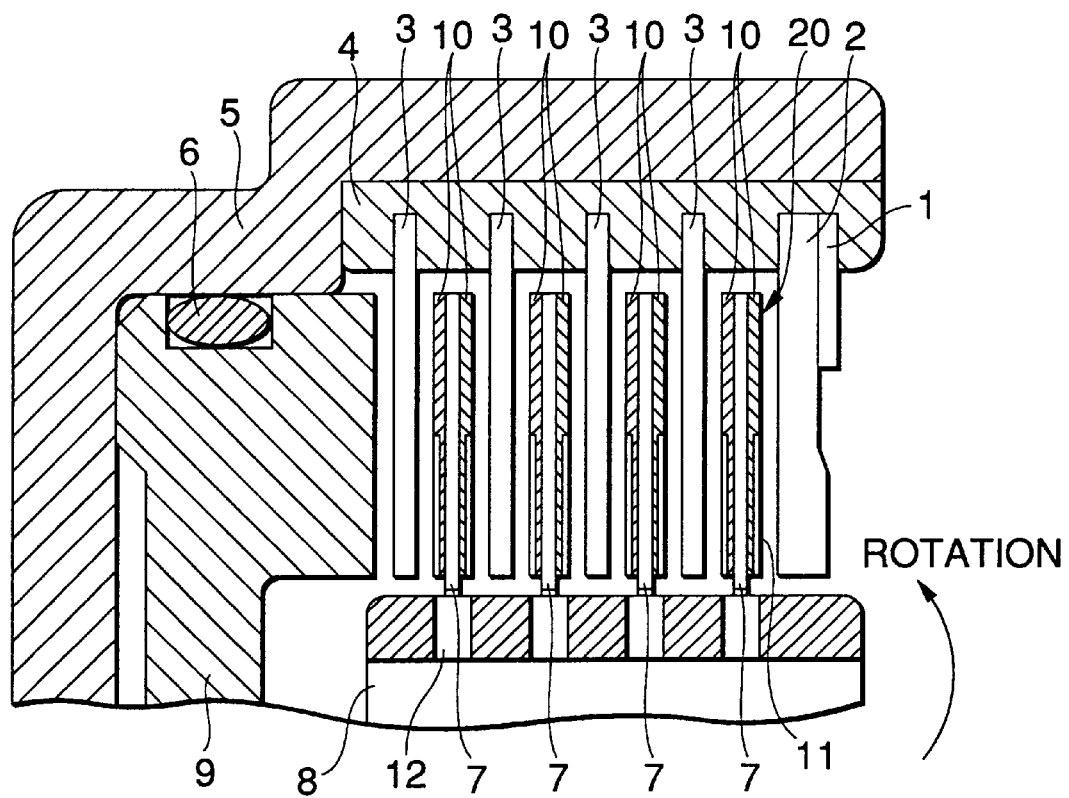
FIG. 1 is a view showing the structure of a wet multi-disk clutch.
Figure 2:
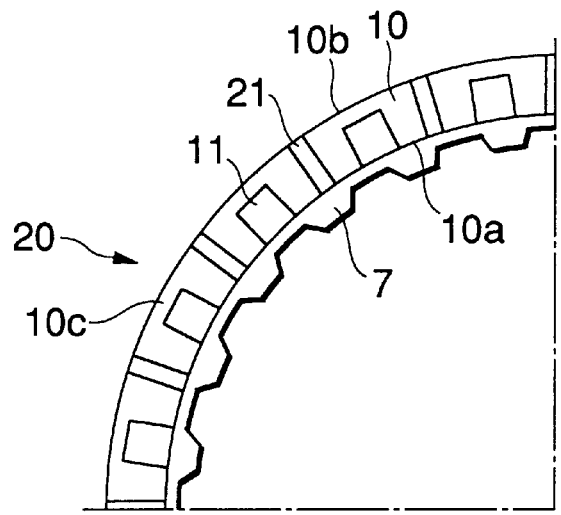
FIG. 2 is a view showing a conventional friction plate.
Figure 11:
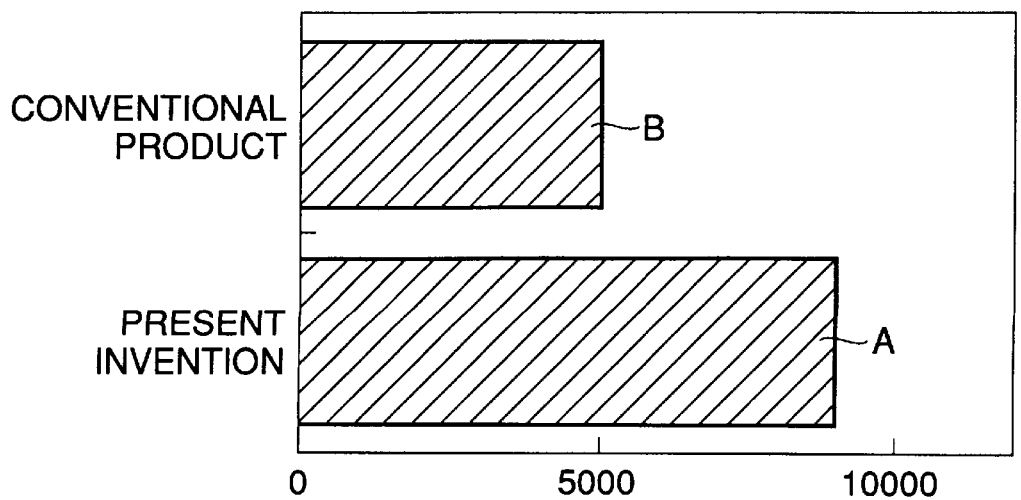
FIG. 11 is a graph showing the comparison of durability between a product of the present invention and the conventional product.

FIG. 11 shows the comparison of durability, and A represent a product of the present invention while B represents the conventional product. It is understood that the product of the present invention is improved, and is about 80% higher in durability. The reasons why the durability is enhanced are that an oil film is suitably kept formed on a friction member 10 and that a width of an oil groove 11 is small, so that a length of that portion (corresponding to the portion 10c in FIG. 2) in a circumferential direction is small. Therefore, the strength is not lowered, and besides the amount of generation of heat is small.

Figure 9A:
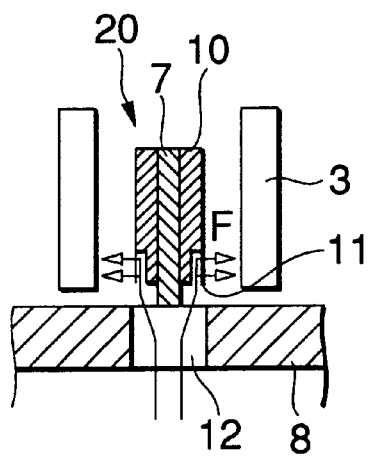
FIGS. 9A and 9B are views explaining an operation in which mating members are separated from a friction plate.
Figure 9B:
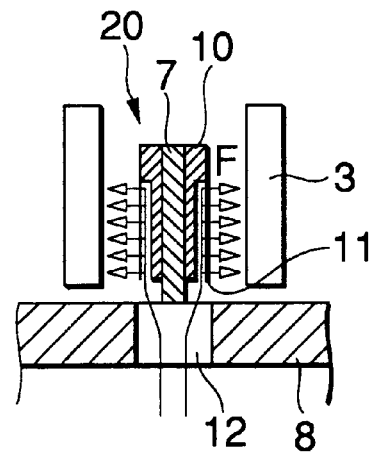

FIGS. 9A and 9B are views explaining the relation between the length of oil grooves 11 and a force serving to separate mating members from the friction plate. In this Figure, the friction plate 20 has a core plate 7, and friction members 10 fixed respectively to opposite sides of the core plate 7. Reference numeral 3 denotes a separator plate (mating member); 8, a hub; 12, an oil supply port, F, a flow of oil, and 11, the oil groove. As understood from FIGS. 9A and 9B, when the length of the oil grooves 11 is larger, the force, which separates the mating member, can be produced in a better balanced manner over the entire surface of the friction member, and therefore a dragging torque, produced at the time of starting the rotation, can be stably set to a lower level as compared with the conventional structure.

In the present invention, although the area of the oil grooves is 25% to 100% of the area of the oil passages, the width of the oil groove is not larger than the width of the oil passage, and therefore the oil groove can be made as long as possible, and this increases the degree of freedom of design. Therefore, for example, the length of the oil grooves can be arbitrarily changed.

Incidentally, in the present invention, the area of the oil passage 21 and the area of the oil groove 11 means their areas at the surface of the friction member 10. Generally, the depth of the oil passage and that of the oil groove is the substantially same. In addition, the section of the oil passage and that of the oil groove in the depth direction is square. Moreover, an area ratio of the oil grooves to the oil passages means the ratio of the total area of all oil grooves formed on the friction member to the total area of all oil passages formed on the friction member.

FIGS. 3 to 8 show various embodiments of friction plates of the present invention, respectively.

Figure 3:
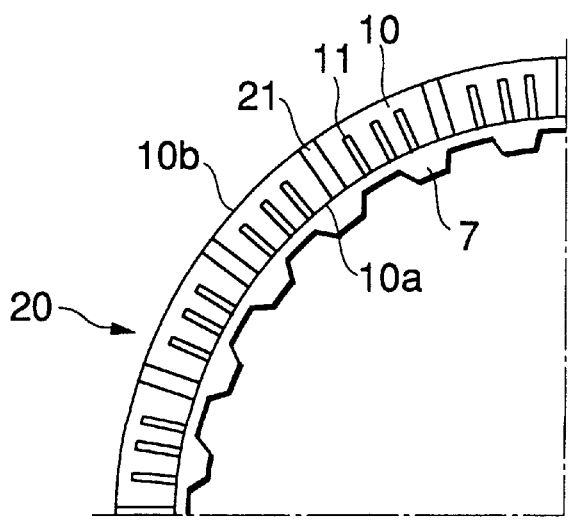
FIG. 3 is a view showing a first embodiment of the present invention.

In FIG. 3, friction plates 10 are fixed to a core plate 7, and the friction member 10 has oil passages 21, extending therethrough from its inner peripheral surface 10a to its outer peripheral surface 10b, and oil grooves 11 which are open to the inner peripheral surface 10a, but do not extend through the friction member 10. In the embodiment of FIG. 3, the plurality of oil grooves 11 (three grooves, in this case), having the same size, are disposed between any two adjacent oil passages 21. However, the oil passages and the oil grooves can be arranged alternately.

Figure 4:
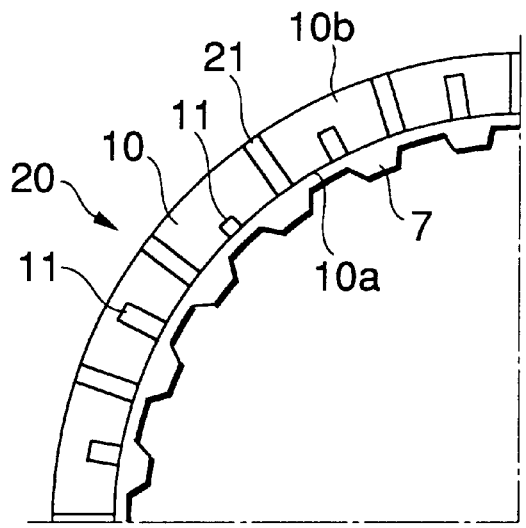
FIG. 4 is a view showing a second embodiment of the invention.

In the embodiment of FIG. 4, the lengths of oil grooves 11 are determined randomly, that is, are different from one portion of the friction member to another. In the embodiment of FIG. 3, also, a desired length can be selected for each of the oil grooves 11.

Figure 5:
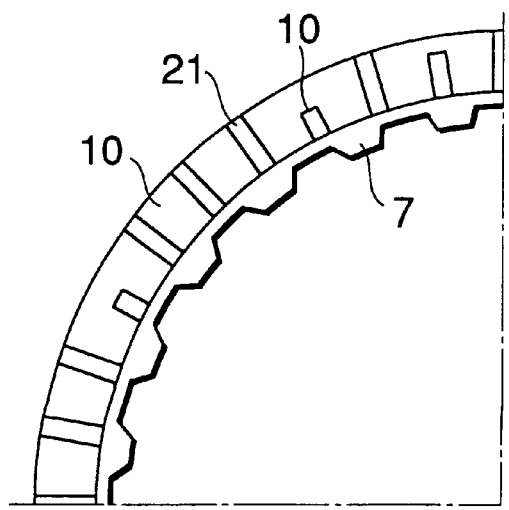
FIG. 5 is a view showing a third embodiment of the invention.

In the embodiment of FIG. 5, in contrast with the embodiment of FIG. 3, a plurality of oil passages 21 are disposed between any two adjacent oil grooves 11.

Figure 6:
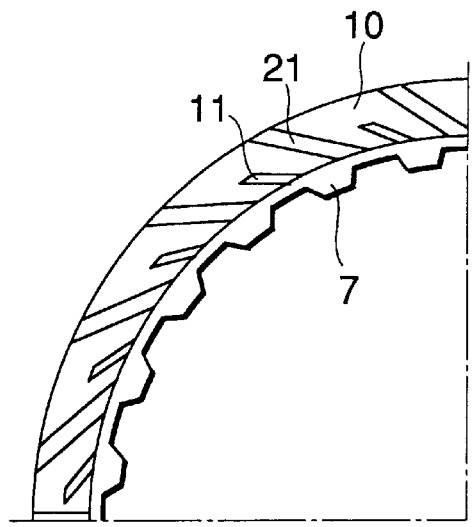
FIG. 6 is a view showing a fourth embodiment of the invention.

In the embodiment of FIG. 6, oil passages 21 and oil grooves 11 are inclined radially.

Figure 7A:
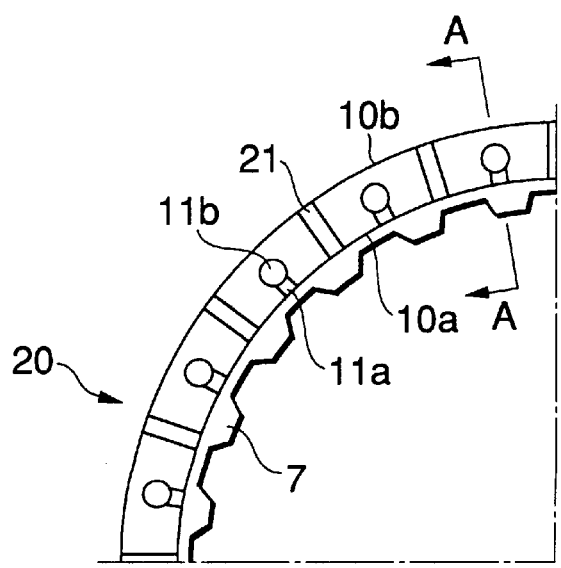
FIGS. 7A and 7B are views showing a fifth embodiment of the invention.
Figure 7B:
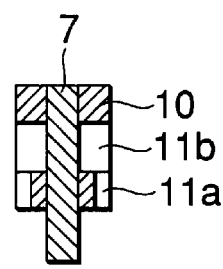

FIG. 7A is a plan view, and FIG. 7B is a cross-sectional view taken along the line A—A of FIG. 7A. In the embodiment of FIG. 7A, an oil reservoir 11b is formed at a distal end of a proximal end portion 11a of each oil groove 11, which is open to an inner peripheral surface 10a of a friction member 10, so that a larger amount of oil can be stored. In the illustrated embodiment, the oil reservoir 11b is greater in depth than the proximal end portion 11a.

Figure 8A:
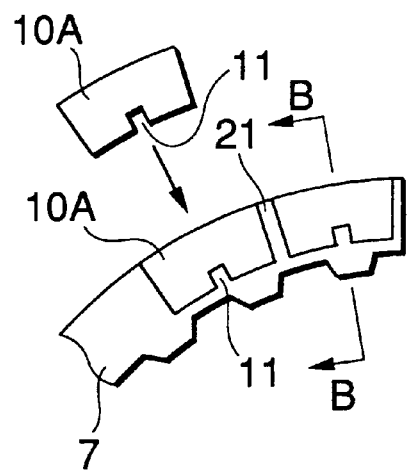
FIGS. 8A and 8B are views showing a sixth embodiment of the invention.
Figure 8B:
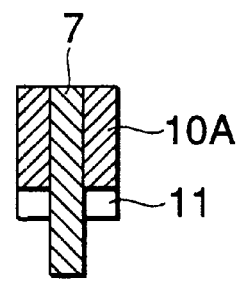

FIG. 8A is a plan view, and FIG. 8B is a cross-sectional view taken along the line B—B of FIG. 8A. In the embodiment of FIG. 8, each oil passage 21 is not formed by cutting a relevant portion after fixedly securing a friction member 10 to a core plate, but segments 10A of a friction material, having a predetermined size, are beforehand prepared. The friction segments 10A are fixed at predetermined intervals to the core plate 7, and a gap between any two adjacent friction segments 10A serves as an oil passage 21. A notch, serving as an oil groove 11, is beforehand formed in the friction segment 10A.

In each of the above embodiments, preferably, the length of the oil groove 11 is not less than ¼ of the length of the oil passage 21, and preferably, the width of the oil passage 21, as well as the width of the oil groove 11, is not more than 3 mm.

With the above structures of the present invention, there can be obtained the friction plate in which the flow and storage of the oil are suitably effected on each friction member, and therefore the cooling of the clutch disks, as well as the separation of the mating members at the time of disengagement of the clutch, is effected satisfactorily, and besides the torque, produced at the time of the operation, is stable, and the lifetime is long.

What is claimed is:

1. A friction plate comprising a core member and friction members fixed respectively to opposite surfaces of the core member, said friction member having oil passages extending therethrough from its inner peripheral surface to its outer peripheral surface, and oil grooves which are open at their inner ends to said inner peripheral surface, but does not extend to said outer peripheral surface;

wherein an area ratio of said oil grooves to said oil passages is 25% to 100%; and a width of said oil groove is not larger than a width of said oil passage.

2. A friction plate according to claim 1, wherein a length of said oil groove is not less than ¼ of a length of said oil passage.

3. A friction plate according to claim 1, wherein said oil passages and said oil grooves are arranged alternately.

4. A friction plate according to claim 1, wherein said oil grooves have a plurality of different lengths.

5. A friction plate according to claim 1, wherein an oil reservoir is formed at a distal end of a proximal end portion of each of said oil grooves which are open to said inner peripheral surface of said friction member.

6. A friction plate according to claim 1, wherein said oil passages and said oil grooves are inclined relative to a radial direction.

7. A friction plate according to claim 1, in which the width of said oil passage, as well as the width of said oil groove, is not more than 3 mm.

8. A friction plate according to claim 1, wherein a plurality of oil grooves are formed between the adjacent oil passages.

* * * * *